United States Patent
Ou et al.

(10) Patent No.: US 9,251,454 B2
(45) Date of Patent: Feb. 2, 2016

(54) STORAGE MEDIUM, TRANSMITTAL SYSTEM AND CONTROL METHOD THEREOF

(71) Applicant: Silicon Motion, Inc., Jhubei (TW)

(72) Inventors: Hsu-Ping Ou, Zhubei (TW); Chih-Yu Chen, New Taipei (TW)

(73) Assignee: Silicon Motion, Inc., Jhubei (TW)

( * ) Notice: Subject to any disclaimer, the term of this patent is extended or adjusted under 35 U.S.C. 154(b) by 650 days.

(21) Appl. No.: 13/659,416

(22) Filed: Oct. 24, 2012

(65) Prior Publication Data

US 2014/0040413 A1  Feb. 6, 2014

(30) Foreign Application Priority Data

Aug. 1, 2012  (TW) .............................. 101127710 A

(51) Int. Cl.
*G06F 13/38* (2006.01)
*G06K 19/07* (2006.01)

(52) U.S. Cl.
CPC ............... *G06K 19/07* (2013.01); *G06F 13/38* (2013.01); *G06F 13/382* (2013.01)

(58) Field of Classification Search
None
See application file for complete search history.

(56) References Cited

U.S. PATENT DOCUMENTS

| 7,308,536 | B2 | 12/2007 | Arimilli et al. | |
| 7,376,773 | B2 * | 5/2008 | Kim et al. | 710/74 |
| 2004/0006654 | A1 | 1/2004 | Bando | |
| 2005/0197017 | A1 * | 9/2005 | Chou et al. | 439/660 |
| 2007/0061501 | A1 * | 3/2007 | Lasser | 711/103 |
| 2013/0132740 | A1 * | 5/2013 | Li | 713/300 |

FOREIGN PATENT DOCUMENTS

| CN | 101739222 A | 6/2010 |
| CN | 202134034 U | 2/2012 |
| TW | M307868 | 3/2007 |
| WO | 99/24926 A1 | 5/1999 |

OTHER PUBLICATIONS

Office Action of corresponding TW application, published on May 20, 2015.
Office Action of corresponding CN application, published on Jul. 14, 2015.

* cited by examiner

*Primary Examiner* — Ilwoo Park
(74) *Attorney, Agent, or Firm* — Wang Law Firm, Inc.; Li K. Wang; Stephen Hsu

(57) ABSTRACT

A storage medium including a first transmittal module and a control module. The first transmittal module includes a plurality of first transmittal pads. The control module determines whether a level state of the first transmittal module is equal to a pre-determined state. When the level state is equal to the pre-determined state, the control module operates in a secure digital (SD) mode. When the level state is not equal to the pre-determined state, the control module operates in an embedded multimedia card (eMMC) mode.

17 Claims, 6 Drawing Sheets

STORAGE MEDIUM, TRANSMITTAL SYSTEM AND CONTROL METHOD THEREOF

CROSS REFERENCE TO RELATED APPLICATIONS

This Application claims the benefit of priority to Taiwan Patent Application No. 101127710, filed on Aug. 1, 2012, the entirety of which is incorporated by reference herein.

BACKGROUND OF THE INVENTION

1. Field of the Invention

The invention relates to an electronic device, and more particularly, to a storage medium.

2. Description of the Related Art

NAND flash memories are widely used for storing data and applied in many electronic products. The NAND flash memories are manufactured into a memory card or a USB flash drive. For the specifications of the flash memories, the flash memories comprise a compact flash (CF), a multi media card (MMC), a smart media (SM) and a secured digital (SD). An embedded multimedia card (eMMC) is extended from the MMC and one of the embedded memories.

BRIEF SUMMARY OF THE INVENTION

In accordance with the embodiment, a storage medium comprises a first transmittal module, and a control module. The first transmittal module comprises a plurality of first transmittal pads. The control module determines whether a level state of the first transmittal module is equal to a pre-determined state. When the level state is equal to the pre-determined state, the control module operates in a secure digital (SD) mode. When the level state is not equal to the pre-determined state, the control module operates in an embedded multimedia card (eMMC) mode.

In accordance with another embodiment, a transmittal system comprises a processing device and a storage medium. The processing device sends a command package. The storage medium is coupled to the processing device and comprises a first transmittal module and a control module. The first transmittal module comprises a plurality of first transmittal pads. The control module determines whether a level state of the first transmittal module is equal to a pre-determined state. When the level state is equal to the pre-determined state, the control module operates in a SD mode. When the level state is not equal to the pre-determined state, the control module operates in an eMMC mode.

In accordance with a further embodiment, a control method of a storage medium comprising a transmittal module comprising a plurality of transmittal pads, comprises: receiving an operation voltage; and determining whether a level state of the transmittal module is equal to a pre-determined state, wherein when the level state is equal to the pre-determined state, a SD mode is entered into, and when the level state is not equal to the pre-determined state, an eMMC mode is entered into.

A detailed description is given in the following embodiments with reference to the accompanying drawings.

BRIEF DESCRIPTION OF THE DRAWINGS

The invention can be more fully understood by referring to the following detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
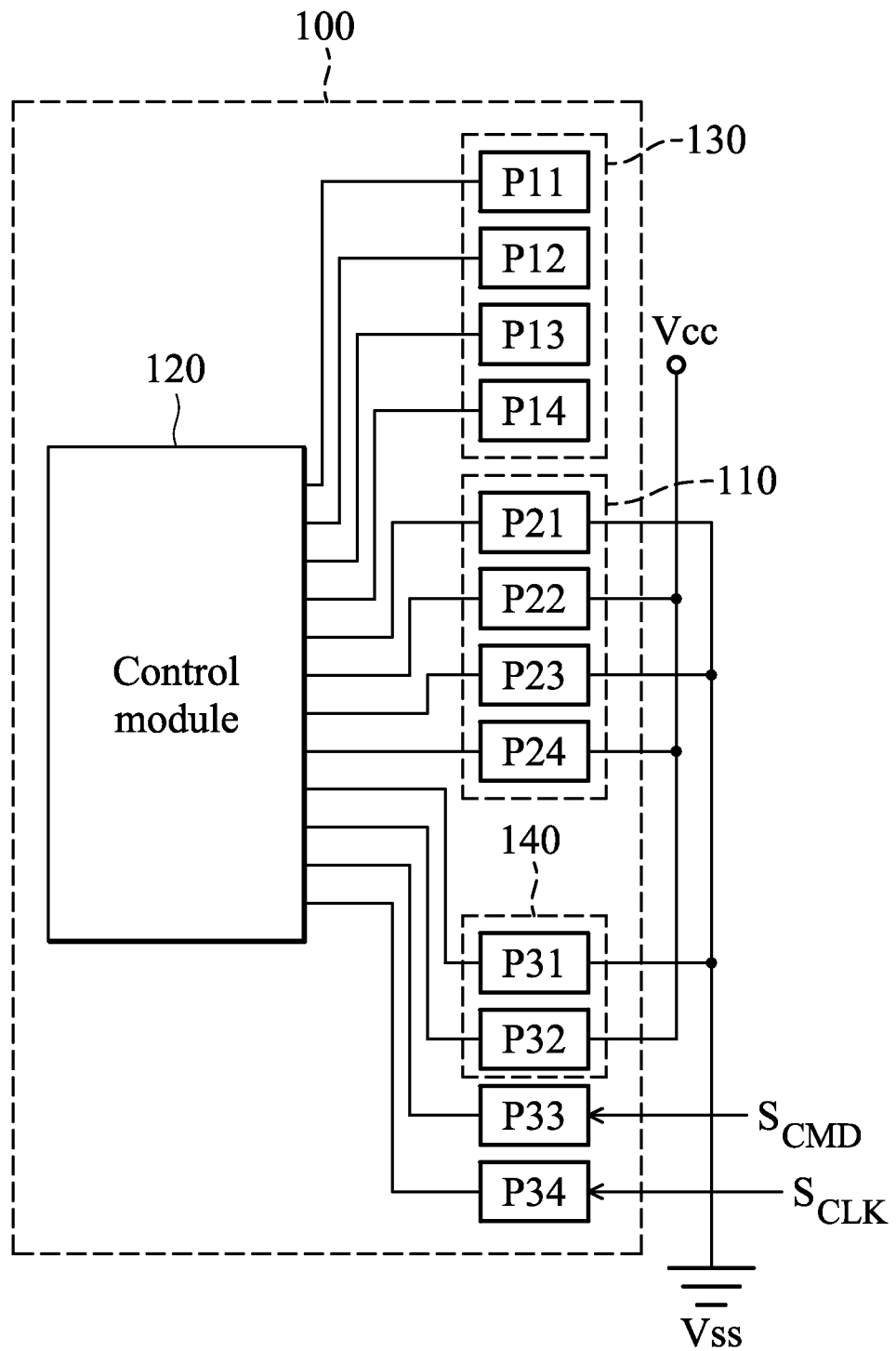
FIG. 1 is a schematic diagram of an exemplary embodiment of a storage medium.

FIG. 1 is a schematic diagram of an exemplary embodiment of a storage medium. The storage medium 100 comprises a transmittal module 110 and a control module 120. The transmittal module 110 comprises transmittal pads P21~P24. The control module 120 determines whether a level state of the transmittal module 110 is equal to a pre-determined state. In this embodiment, the control module 120 determines an operation mode according to the level state of the transmittal module 110.

The invention does not limit the method of setting the level state of the transmittal module 110. In this embodiment, the transmittal pads P21 and P23 are coupled to an external pin Vss to receive a low operation voltage. Thus, the level state of the transmittal pads P21 and P23 is 00. The transmittal pads P22 and P24 are coupled to an external pin Vcc to receive a high operation voltage. Thus, the level state of the transmittal pads P22 and P24 is 11. To combine the level states of the transmittal pads P21~P24, the level state of the transmittal module 110 is 0101.

The control module 120 compares the level state of the transmittal module 110 and a pre-determined state. When the level state of the transmittal module 110 is equal to the pre-determined state, the operation module 120 operates in a secure digital (SD) mode. In the SD mode, the control module 120 does not utilize the transmittal module 110 to communicate with an external processing device (not shown).

When the level state of the transmittal module 110 is not equal to the pre-determined state, the operation module 120 operates in an embedded multimedia card (eMMC) mode. In the eMMC mode, the control module 120 utilizes the transmittal module 110 to communicate with the external processing device.

In this embodiment, the storage medium 100 further comprises a transmittal module 130. The transmittal module 130 comprises transmittal pads P11~P14 to transmit data. In the SD mode, the control module 120 complies with a first protocol and utilizes the transmittal module 130 to communicate with an external processing device. In the eMMC mode, the control module 120 complies with a second protocol and utilizes the transmittal modules 110 and 130 to communicate with the external processing device. In one embodiment, the first protocol conforms to a specification for a SD, and the second protocol conforms to a specification for an eMMC.

In this embodiment, the level state of the transmittal module 110 is 0101, but the disclosure is not limited thereto. In other embodiments, when a level of one of the transmittal pads P21~P24 is set to be different from a level of another of the transmittal pads P21~P24, the control module 120 operates in the SD mode. Alternatively, when the levels of the transmittal pads P21~P24 are the same, the control module 120 operates in the eMMC mode.

Additionally, the storage medium 100 further comprises a power module 140. The power module 140 comprises power transmittal pads P31 and P32. The power transmittal pad P31 is coupled to the pin Vss to receive the low operation voltage. The power transmittal pad P32 is coupled to the pin Vcc to receive the high operation voltage. In this embodiment, an operation voltage received by the pin Vss is lower than an operation voltage received by the pin Vcc.

The control module 120 starts operating according to the operation voltages received by the pins Vss and Vcc. In one embodiment, when the level of the power module 140 is equal to a pre-determined value, the control module 120 starts to determine an operation mode according to the level state of the transmittal module 110.

Figure 2A:
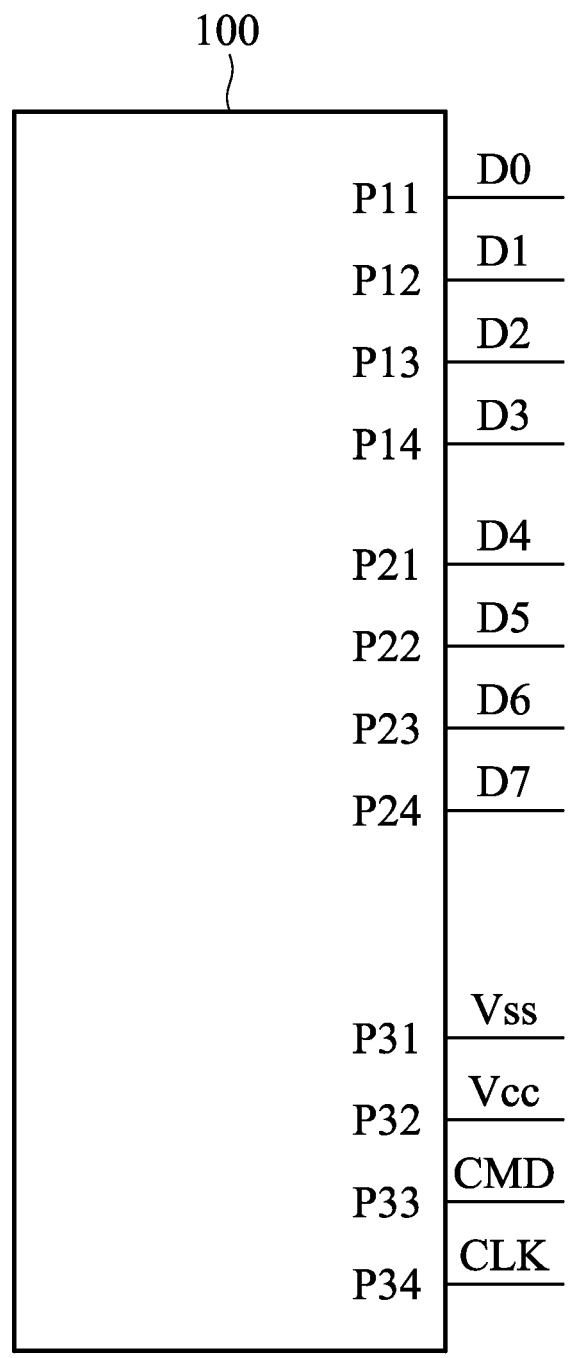
FIG. 2A is an applied schematic diagram of an exemplary embodiment of the storage medium.

FIG. 2A is an applied schematic diagram of an exemplary embodiment of the storage medium. In this embodiment, the storage medium 100 is packaged in a case to serve as an eMMC. The transmittal pads (or called to data pads) P11~P14 and P21~P24 are served as data pins D0~D7 of the eMMC, respectively. The power transmittal pads P31 and P32 are served as the pins Vss and Vcc of the eMMC. A command transmittal pad P33 and a clock transmittal pad P34 are served as the pins CMD and CLK of the eMMC, respectively.

When the pins Vss and Vcc receive the corresponding voltages, the storage medium 100 reads a command package received by the pin CMD according to a clock signal received by the pin CLK and decodes the command package. The storage medium 100 communicates with an external processing device via the pins D0~D7 according to the decoded result. Since the specification of the eMMC is known to those skilled in the art, the description of the eMMC is omitted.

In other embodiments, when the packaged storage medium 100 is soldered in a transformation board (not shown) and the transmittal pads P21~P24 are coupled to the corresponding power transmittal pad P31 or P32 via a plurality of tracks, the soldered storage medium utilizes another protocol for data communication.

Since the level of one of the transmittal pads P21~P24 is different from the level of another of the transmittal pads P21~P24, when the soldered storage medium is packaged into a SD case, the packaged storage medium is served as a SD card and communicates with an external processing device according to the SD specification.

Figure 2B:
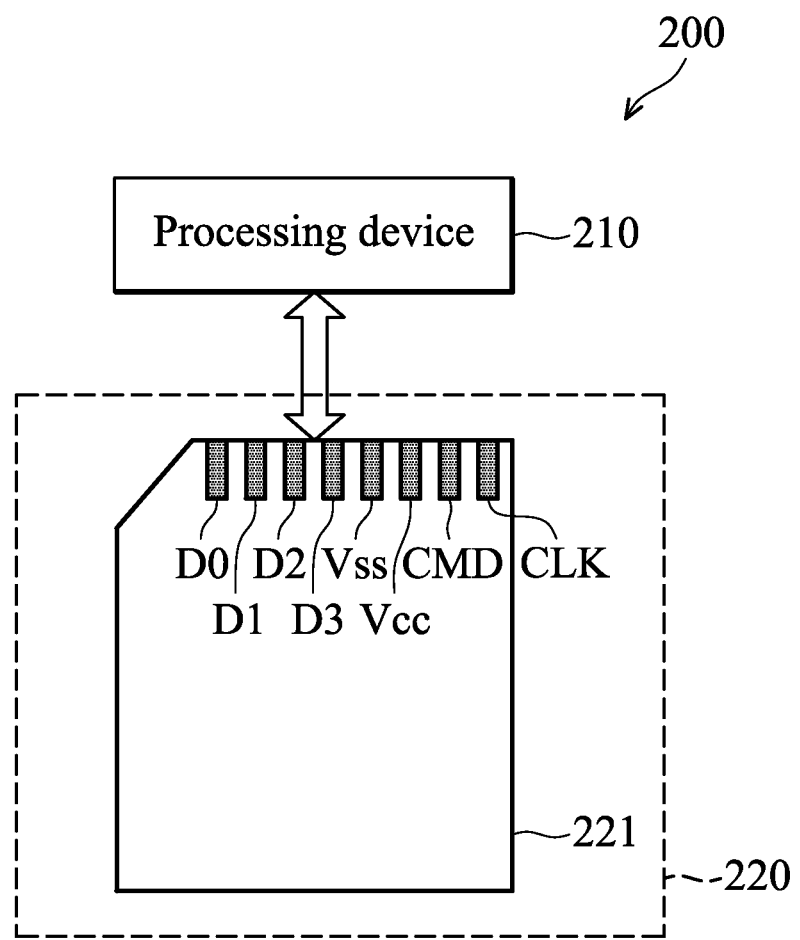
FIG. 2B is an applied schematic diagram of an exemplary embodiment of the storage medium.

FIG. 2B is an applied schematic diagram of an exemplary embodiment of the storage medium. The transmittal system 200 comprises a processing device 210 and a storage medium 220. The processing device 210 communicates with the storage medium 220. In this embodiment, the storage medium 100 shown in FIG. 1 is packaged in a SD case 221 to serve as the storage medium 220.

The storage medium 220 comprises the pins D0~D3, Vss, Vcc, CMD and CLK. In this embodiment, the pins D0~D3 are coupled to the transmittal pads P11~P14 shown in FIG. 1, respectively. The pins Vss, Vcc, CMD and CLK are coupled to the power transmittal pads P31, P32, the command transmittal pad P33 and the clock transmittal pad P34, respectively.

When the pins Vss and Vcc receive the corresponding voltages, the storage medium 220 reads a command package $S_{CMD}$ received by the pin CMD according to a clock signal $S_{CLK}$ received by the pin CLK and decodes the command package $S_{CND}$. The storage medium 220 receives data provided from the processing device 210 or provides data to the processing device 210 via the pins D0~D4 according to the decoded result.

In this embodiment, since the level of one of the transmittal pads P21~P24 is set to be different from the level of another of the transmittal pads P21~P24, the storage medium 220 operates in response to a SD command. For example, when the processing device 210 sends a command package confirming with an eMMC specification, the storage medium 220 does not operate. Contrarily, when the processing device 210 sends a command package confirming with a SD specification, the storage medium 220 executes a corresponding access action according to the command package.

In this embodiment, the operation mode of the control module 120 is determined according to the level state of the transmittal pads P21~P24. For example, when the level state of the transmittal pads P21~P24 are not fixed, the storage medium 100 is served as a first memory. The first memory is an embedded memory, such as an eMMC and communicates with an external processing device via the transmittal pads P21~P24.

In other embodiments, when the level state of the transmittal pads P21~P24 are fixed, the storage medium 100 is served as a second memory. The second memory is an outer type memory, such as a SD card and does not utilize the transmittal pads P21~P24 to communicate with the external processing device.

Figure 3A:
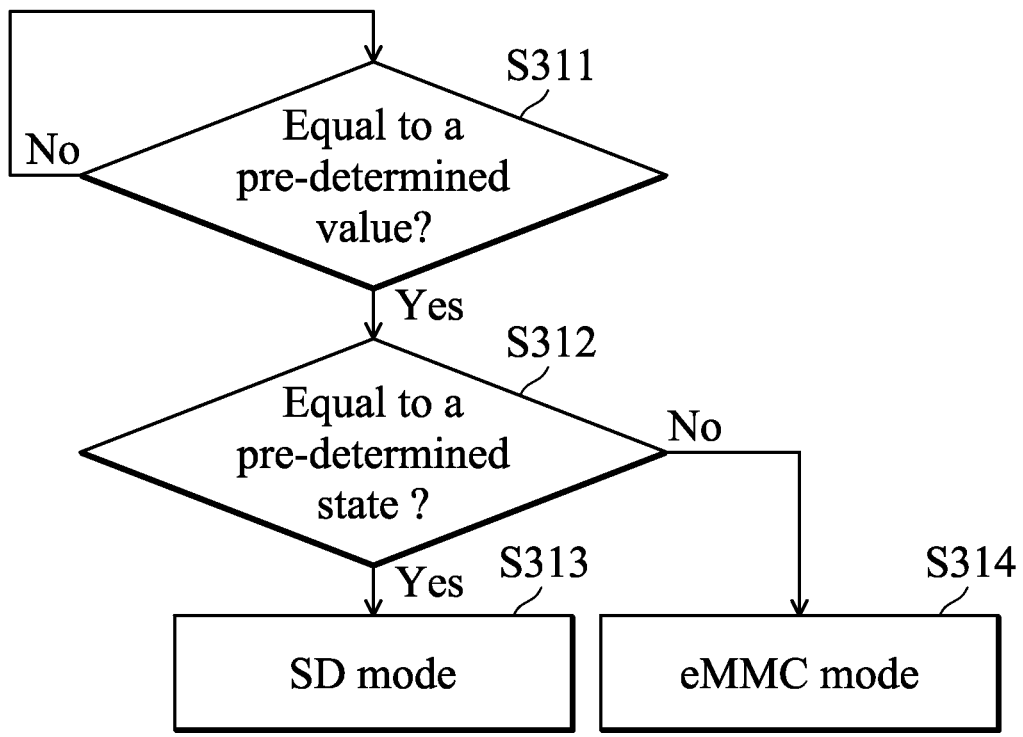
FIG. 3A-3C are schematic diagrams of exemplary embodiments of a control method.

FIG. 3A is a schematic diagram of an exemplary embodiment of a control method. First, it is determined whether the level of the power module 140 is equal to a pre-determined value (step S311). In one embodiment, the control module 120 is utilized to detect the level of the power module 140 and compares the detection result with a pre-determined value to determine whether the level of the power module 140 is equal to the pre-determined value.

When the level of the power module 140 is not equal to the pre-determined value, it represents that the power transmittal pads P31 and P32 have not received the corresponding voltages. Thus, step S311 is again executed to determine whether the level of the power module 140 is equal to the pre-determined value. When the level of the power module 140 is equal to the pre-determined value, it represents that the power transmittal pads P31 and P32 have received the corresponding voltages. Thus, it is determined whether the level state of the transmittal module 110 is equal to the pre-determined state (step S312).

When the level state of the transmittal module 110 is equal to the pre-determined state, the control module 120 operates in a SD mode (step S313). In the SD mode, the control module 120 does not utilize the transmittal module 110 to communicate with an external processing device. In one embodiment, the control module 120 utilizes the transmittal module 130 and a first protocol to communicate with the external processing module. The first protocol conforms with a SD specification.

When the level state of the transmittal module 110 is not equal to the pre-determined state, the control module 120 operates in an eMMC mode (step S314). In the eMMC mode, the control module 120 communicates with the external processing module via the transmittal module 110. In one embodiment, the control module 120 complies with a second protocol to communicate with the external processing device via the transmittal modules 110 and 130. The second protocol conforms with an eMMC specification.

Figure 3B:
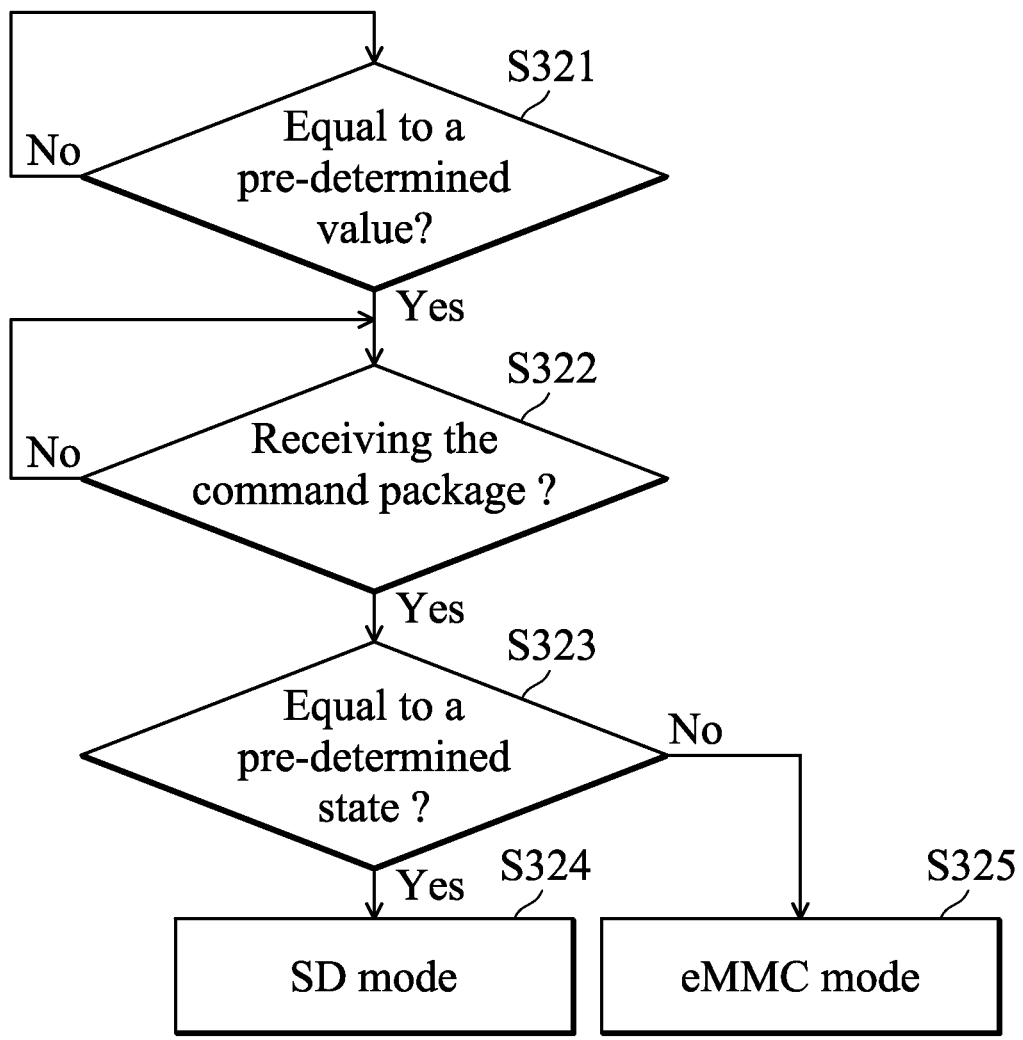

Refer to FIG. 1, the storage medium 100 further comprises a command transmittal pad P33 to receive a command package $S_{CMD}$. FIG. 3B is a schematic diagram of another exemplary embodiment of the control method. First, it is determined whether the level of the power module 140 is equal to a pre-determined value (step S321).

When the level of the power module 140 is not equal to the pre-determined value, step S321 is executed. When the level of the power module 140 is equal to a pre-determined value, it is determined whether the command transmittal pad P33 has received the command package $S_{CMD}$ (step S322). When the command transmittal pad P33 has received the command package $S_{CMD}$, step S322 is executed. When the command transmittal pad P33 has received the command package $S_{CMD}$, it is determined whether the level state of the transmittal module 110 is equal to the pre-determined state (step S323).

When the level state of the transmittal module 110 is equal to the pre-determined state, the control module 120 operates in a SD mode (step S324). In the SD mode, when the command package $S_{CMD}$ conforms with eMMC specification, the control module 120 does not operate in response to the command package $S_{CMD}$. Contrarily, when the command package $S_{CMD}$ conforms with a specification of a SD, the control module 120 executes a corresponding action according to the command package $S_{CMD}$.

When the level state of the transmittal module 110 is not equal to the pre-determined state, the control module 120 operates in an eMMC mode (step S325). In the eMMC mode, when the command package $S_{CMD}$ conforms with the specification of the SD, the control module 120 does not operate in response to the command package $S_{CMD}$. Alternatively, in the eMMC mode, when the command package $S_{CMD}$ conforms with the specification of the eMMC, the control module 120 executes a corresponding action according to the command package $S_{CMD}$.

Figure 3C:
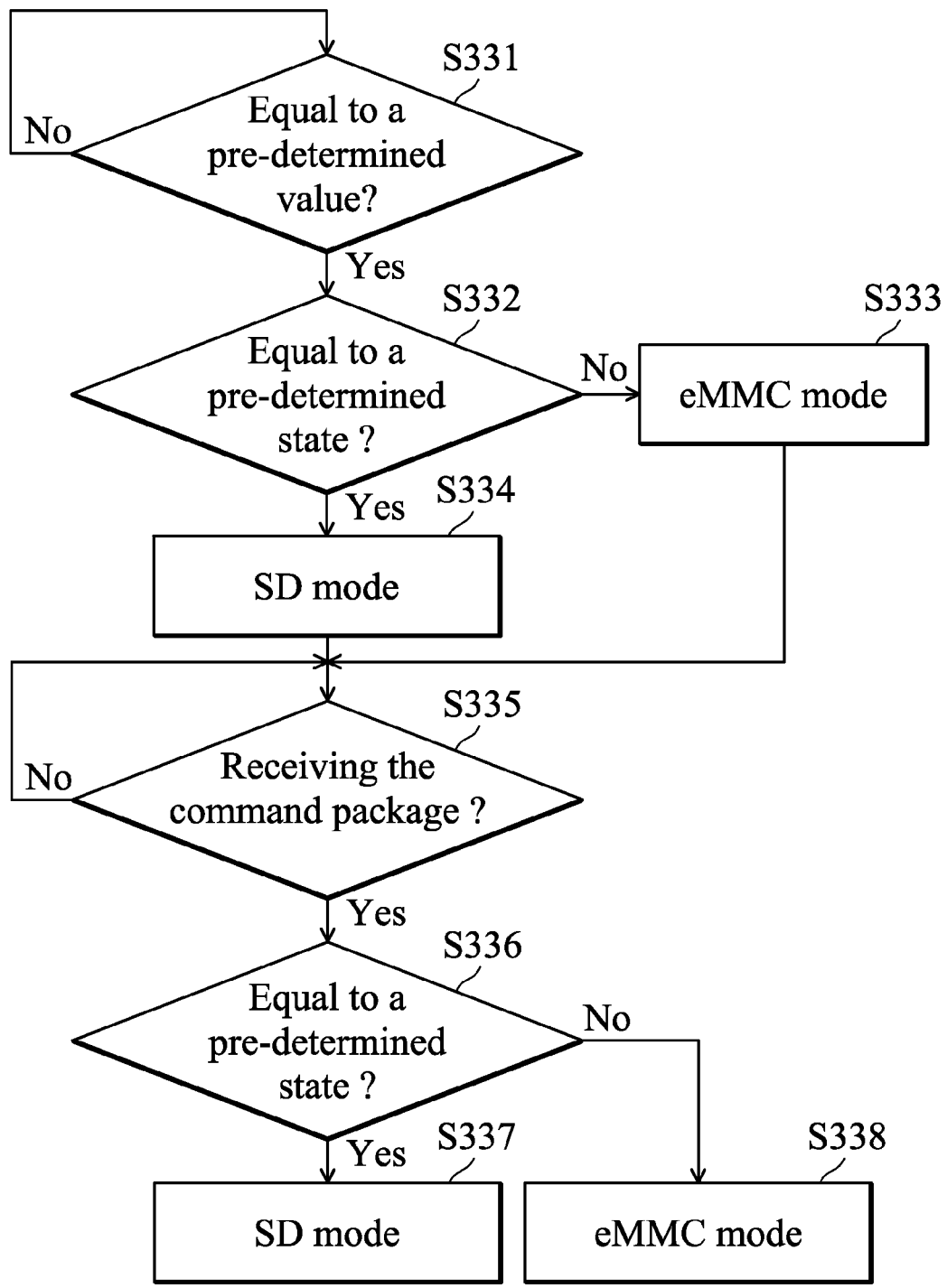

FIG. 3C is a schematic diagram of another exemplary embodiment of the control method. First, it is determined whether the level of the power module 140 is equal to a pre-determined value (step S331). When the level of the power module 140 is not equal to the pre-determined value, step S331 is executed. When the level of the power module 140 is equal to the pre-determined value, it is determined whether the level state of the transmittal module 110 is equal to a pre-determined state (step S332).

When the level state of the transmittal module 110 is equal to the pre-determined state, the control module 120 operates in a SD mode (step S334). When the level state of the transmittal module 110 is not equal to the pre-determined state, the control module 120 operates in an eMMC mode (step S333). Then, it is determined whether the command transmittal pad P33 has received a command package $S_{CMD}$ (step S335).

When the command transmittal pad P33 has received the command package $S_{CMD}$, step S335 is executed. When the command transmittal pad P33 receives the command package $S_{CMD}$, it is again determined whether the level state of the transmittal module 110 is equal to the pre-determined state (step S336).

When the level state of the transmittal module 110 is equal to the pre-determined state, the storage medium 100 is operated in the SD mode (step S337). When the level state of the transmittal module 110 is not equal to the pre-determined state, the storage medium 100 is operated in the eMMC mode (step S338). In this embodiment, the level state of the transmittal module 110 is determined twice to measure that the level state of the transmittal module 110 is equal to the pre-determined state to reduce misjudgments.

In one embodiment, the storage medium 100 shown in FIG. 1 is packaged to form a memory. When the memory is utilized and the level state of the transmittal pads P21~P24 are not fixed, the control module 120 complies with the eMMC specification and utilizes the transmittal modules P1~P14 and P21~P24 to communicate with an external processing device.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A storage medium comprising:
a first transmittal module comprising a plurality of first transmittal pads; and a control module determining whether a level state of the first transmittal module is equal to a pre-determined state, wherein when the level state is equal to the pre-determined state, the control module operates in a secure digital (SD) mode, and when the level state is not equal to the pre-determined state, the control module operates in an embedded multimedia card (eMMC) mode, wherein in the SD mode, the control module does not utilize the first transmittal module to communicate with a processing device, and in the eMMC mode, the control module utilizes the first transmittal module to communicate with the processing device.

2. The storage medium as claimed in claim 1, further comprising:
a second transmittal module comprising a plurality of second transmittal pads comprising a first data pad, a second data pad, a third data pad and a fourth data pad, wherein in the eMMC mode, the first data pad is served as a first data pin of a eMMC, the second data pad is served as a second data pin of the eMMC, the third data pad is served as a third data pin of the eMMC, and the fourth data pad is served as a fourth data pin of the eMMC,
wherein the first transmittal pads comprise a fifth data pad, a sixth data pad, a seventh data pad and an eighth data pad,
wherein the fifth data pad is served as a fifth data pin of the eMMC, the sixth data pad is served as a sixth data pin of the eMMC, the seventh data pad is served as a seventh data pin of the eMMC, and the eighth data pad is served as an eighth data pin of the eMMC.

3. The storage medium as claimed in claim 1, wherein a level of one of the first transmittal pads is different from a level of another of the first transmittal pads.

4. The storage medium as claimed in claim 1, further comprising a power module, wherein when a level of the power module is equal to a pre-determined value, the control module starts to determine whether the level state is equal to the pre-determined state.

5. The storage medium as claimed in claim 4, further comprising a command transmittal pad, wherein when the level of the power module is equal to the pre-determined value, the control module determines whether the command transmittal pad receives a command package, and when the command transmittal pad receives the command package, the control module starts to determine whether the level state is equal to the pre-determined state.

6. The storage medium as claimed in claim 5, wherein after the level of the power module is equal to the pre-determined value, the control module determines whether the level state is equal to the pre-determined state, and when the level state is equal to the pre-determined state, the control module determines whether the command transmittal pad receives the command package, and when the command transmittal pad receives the command package, the control module again determines whether the level state is equal to the pre-determined state.

7. A transmittal system comprising:
a processing device sending a command package; and
a storage medium coupled to the processing device and comprising:
a first transmittal module comprising a plurality of first transmittal pads; and
a control module determining whether a level state of the first transmittal module is equal to a pre-determined state, wherein when the level state is equal to the pre-determined state, the control module operates in a SD mode, and when the level state is not equal to the pre-determined state, the control module operates in an eMMC mode, wherein in the SD mode, the control module does not utilize the first transmittal module to communicate with the processing device, and in the eMMC mode, the control module utilizes the first transmittal module to communicate with the processing device.

8. The transmittal system as claimed in claim 7, further comprising:
a second transmittal module comprising a plurality of second transmittal pads comprising a first data pad, a second data pad, a third data pad and a fourth data pad, wherein in the eMMC mode, the first data pad is served as a first data pin of a eMMC, the second data pad is served as a second data pin of the eMMC, the third data pad is served as a third data pin of the eMMC, and the fourth data pad is served as a fourth data pin of the eMMC,
wherein the first transmittal pads comprise a fifth data pad, a sixth data pad, a seventh data pad and an eighth data pad,
wherein the fifth data pad is served as a fifth data pin of the eMMC, the sixth data pad is served as a sixth data pin of the eMMC, the seventh data pad is served as a seventh data pin of the eMMC, and the eighth data pad is served as an eighth data pin of the eMMC.

9. The transmittal system as claimed in claim 7, wherein a level of one of the first transmittal pads is different from a level of another of the first transmittal pads.

10. The transmittal system as claimed in claim 7, further comprising a power module, wherein when a level of the power module is equal to a pre-determined value, the control module starts to determine whether the level state is equal to the pre-determined state.

11. The transmittal system as claimed in claim 10, further comprising a command transmittal pad, wherein when the level of the power module is equal to the pre-determined value, the control module determines whether the command transmittal pad receives a command package, and when the command transmittal pad receives the command package, the control module starts to determine whether the level state is equal to the pre-determined state.

12. The transmittal system as claimed in claim 11, wherein after the level of the power module is equal to the pre-determined value, the control module determines whether the level state is equal to the pre-determined state, and when the level state is equal to the pre-determined state, the control module determines whether the command transmittal pad receives the command package, and when the command transmittal pad receives the command package, the control module again determines whether the level state is equal to the pre-determined state.

13. A control method for a storage medium comprising a transmittal module comprising a plurality of transmittal pads, comprising:
receiving an operation voltage; and
determining whether a level state of the transmittal module is equal to a pre-determined state, wherein when the level state is equal to the pre-determined state, a SD mode is entered into, and when the level state is not equal to the pre-determined state, an eMMC mode is entered into, wherein in the SD mode, the transmittal module is not utilized to communicate with a processing device, and in the eMMC module, the transmittal module is utilized to communicate with the processing device.

14. The control method as claimed in claim 13, wherein in the SD mode, a first protocol is utilized to communicate with the processing device, and the first protocol conforms to a specification for a SD, and
in the eMMC mode, a second protocol is utilized to communicate with the processing device, and the first protocol conforms to a specification for an eMMC.

15. The control method as claimed in claim 13, further comprising:
determining whether the operation voltage is equal to a pre-determined value, wherein when the operation voltage is equal to the pre-determined value, whether the level state is equal to the pre-determined state is determined.

16. The control method as claimed in claim 13, further comprising:
determining whether the operation voltage is equal to a pre-determined value, wherein when the operation voltage is equal to the pre-determined value, whether a command package has been received is determined, and when the command package has been received, whether the level state is equal to the pre-determined state is determined.

17. The control method as claimed in claim 13, further comprising:
determining whether the operation voltage is equal to a pre-determined value, wherein when the operation voltage is equal to the pre-determined value, whether the level state is equal to the pre-determined state is determined;
determining whether a command package has been received when the level state is equal to the pre-determined state, wherein when the command package is received, it is again determined whether the level state is equal to the pre-determined state.

* * * * *